Oct. 20, 1925.  1,557,847
A. KERR
ANIMAL TRAP
Filed Sept. 11, 1924   2 Sheets-Sheet 1
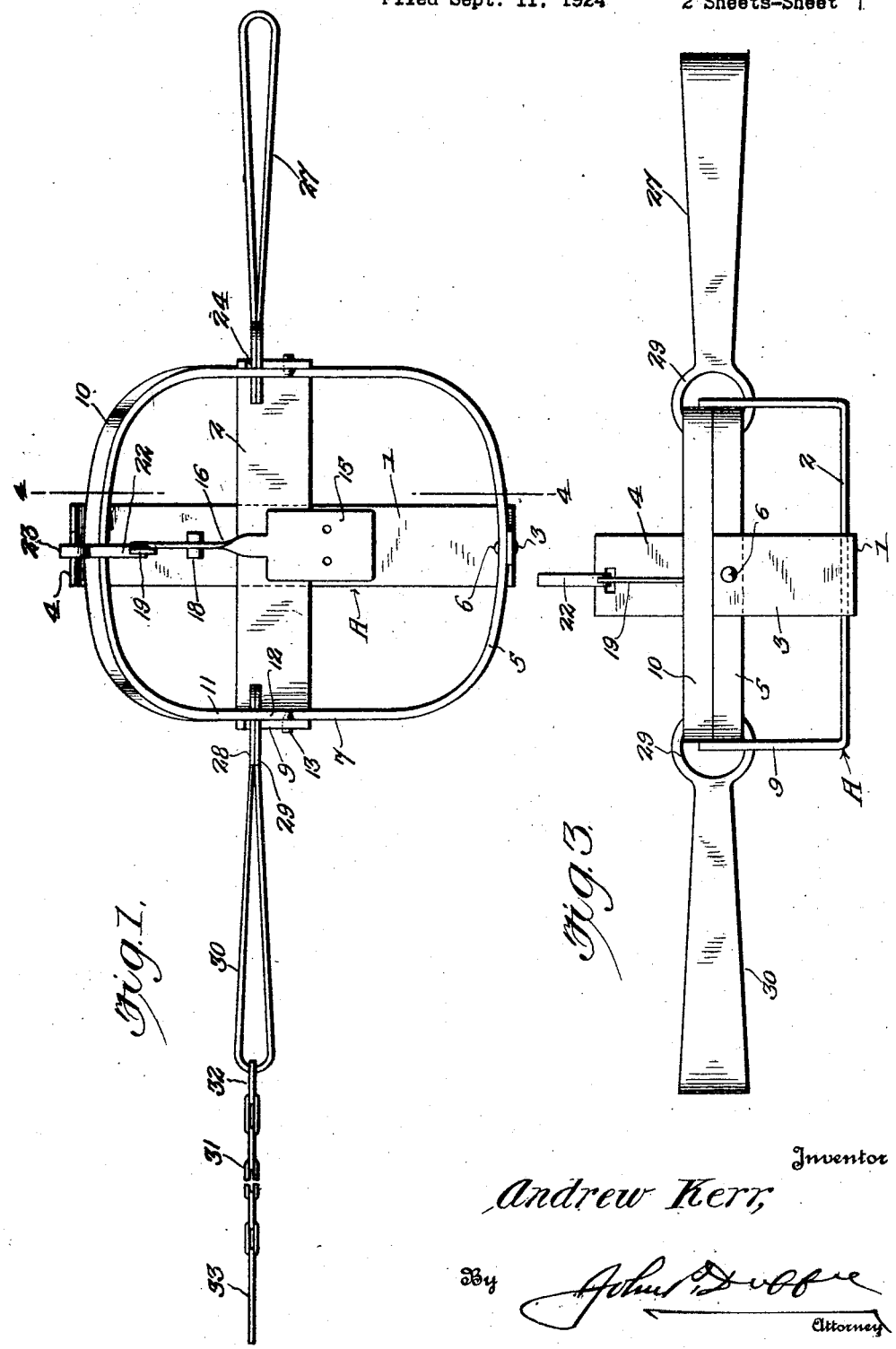
Inventor
Andrew Kerr,
By
Attorney

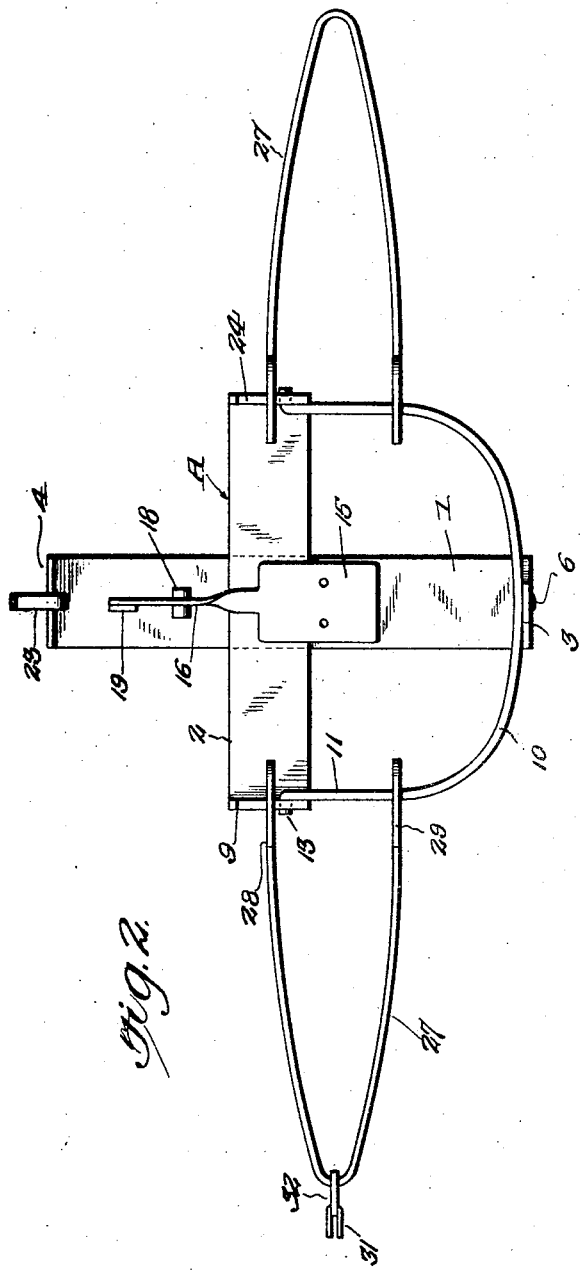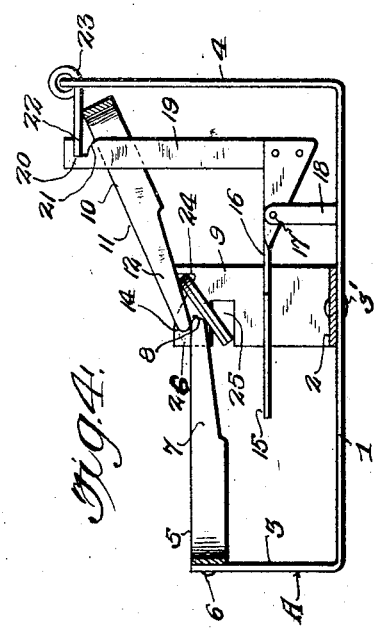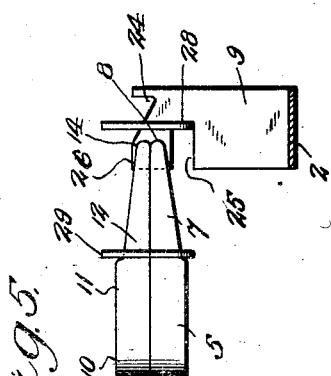

Patented Oct. 20, 1925.

1,557,847

UNITED STATES PATENT OFFICE.

ANDREW KERR, OF TEFFT, INDIANA.

ANIMAL TRAP.

Application filed September 11, 1924. Serial No. 737,083.

*To all whom it may concern:*

Be it known that ANDREW KERR, a citizen of the United States, residing at Tefft, in the county of Jasper and State of Indiana, has invented certain new and useful Improvements in Animal Traps, of which the following is a specification.

This invention relates to new and useful improvements in animal traps.

The primary object of my invention is to provide a trap that is humane in operation in that it catches the animal by the head and causes instant death.

A further object of my invention is to provide a device of this character which is simple and economical in construction and highly efficient in operation.

With the foregoing and other objects in view that will appear as the nature of my invention is better understood the same consists in the novel features of construction, combination and arrangement of parts illustrated in the drawings and more particularly pointed out in the appended claims.

In the accompanying drawings which are for illustrative purposes only and are therefore not drawn to scale:

Figure 1 is a plan view of the trap set.

Figure 2 is a similar view of the trap sprung.

Figure 3 is a side elevation of Figure 1.

Figure 4 is a central longitudinal sectional view taken on line 4—4 of Figure 1.

Figure 5 is a detail section taken through the frame and the stationary and movable jaws and associated parts of the trap when sprung.

Referring to the drawings for a more particular description of my invention and in which drawings like parts are designated by like reference characters throughout the several views, my device comprises a frame A consisting of the flat horizontal longitudinally disposed bar 1 and the flat shorter cross bar 2 riveted or otherwise secured at its point of intersection, as 3′ with the longitudinal bar. The frame A rests on the ground or other support and the longitudinal bar 1 is provided at opposite ends with the shorter and longer perpendicular arms or portions 3 and 4, respectively.

A stationary jaw 5 of approximately U-shaped form in plan is arranged in a horizontal position with its central portion riveted or otherwise secured as at 6 to the upper end of the shorter perpendicular arm 3 of the frame bar 1 and the outer ends of its reduced outwardly tapering end portions 7 engaging transverse eyes or apertures 8 formed in the perpendicular arms 9 of the transverse frame bar adjacent the upper inner corners of the former. The movable jaw 10 of the trap, which corresponds in size and shape to the stationary jaw 5 is formed at the outer ends 11 of its reduced end portions 12 with cylindrical pins or extensions 13 which extend outwardly and laterally therefrom and work in corresponding transverse bearing eyes 14 also formed in the upper inner corners of the perpendicular arms 9 of the frame bar 2.

The bait holder comprises a flat rectangular head 15 formed at one end with a longitudinally disposed shank 16 which is pivoted intermediate its ends, as at 17 to the upright bearing bracket 18 rigidly mounted on the frame bar 1 adjacent the bar 2. The outer end of the shank 16 is provided with a perpendicular arm 19 formed in its outer end with a notched or recessed portion 20 having an upper downwardly inclined wall 21 adapted to be engaged by the recessed outer end 22 of the trigger 23 pivoted to the upper end of the longer perpendicular arm 4 of the frame bar 1. The perpendicular arms 9 of the cross bar 2 are formed in their upper and outer corners with vertical recesses 24, and in their inner edges immediately below the ends of the stationary jaw 5 with lateral recesses 25 leaving the offset horizontal lugs 26. The springs 27 which are of approximately V-shaped form in plan and are formed at opposite ends with cylindrical eyes 28 and 29, respectively, are arranged with the eyes 28 encircling the lugs 26 and engaging the recesses 24 and 25, and with the eyes 29 encircling the inner ends of the reduced end portions of the stationary and hinged jaws 5 and 10. To set the trap, the outer ends of the inner members 30 of the springs 27 are first compressed until the eyes 29 encircle the lugs 26 and engage the recesses 24 and 25 when the hinged jaw 10 is swung up and then down in the arc of a circle over the upper end of the arm 19 of the bait holder and the trigger 23 is then engaged with the recessed portion 22 of said arm, which engagement is maintained by the tension of the springs 27. When the animal nibbles the bait the arm 19 of the bait holder is released from the trigger when the hinged jaw is sprung by the action of the springs. The animal is caught by the head and instant death is caused. In this respect, my trap is very humane in that the animal is not caused to unnecessarily suffer. A chain 31 is connected by the clip 32 with one of the springs and is provided at its free end with a wedge 33 which is driven into the ground or other support.

From the foregoing description, taken in connection with the drawings, it is thought that the construction, operation and advantages of my invention will be readily understood without requiring a more extended explanation.

Having described my invention what I claim as new and desire to secure by Letters Patent is:

1. In a device of the character specified a frame consisting of a longer and a shorter longitudinal and transverse bar, a stationary jaw of approximately U-shaped form rigidly secured to the shorter bar of said frame, a corresponding movable jaw also hinged at its ends to the ends of the shorter frame bar and coacting with said stationary jaw, a bait holder pivoted to the longitudinal frame bar and comprising a perpendicular arm formed in its upper end and outer edge with a notch, a trigger pivoted to the longer frame bar and engageable with the notched portion of said trigger arm, and springs exerting a tension on the hinged jaw when the trap is set.

2. In a device of the character specified, a frame comprising a longer and a shorter longitudinal and cross bar, a stationary jaw of approximately U-shaped form rigidly secured to the shorter bar, a bait holder pivoted to the longitudinal frame bar and comprising a perpendicular arm formed in its upper end and outer edge with a notch, a perpendicular arm formed at the adjacent end of the longer frame bar, a trigger hinged to the upper end of said perpendicular arm and having an outer end adapted to engage the notched portion of the perpendicular arm of the bait holder, a movable jaw hinged to the ends of the shorter bar of the frame and adapted to swing upwardly and downwardly over the perpendicular arm of the bait holder and under the trigger in setting the trap and V-shaped springs arranged with one end engaging the ends of the cross bar of the frame and their opposite ends encircling the ends of the stationary and movable jaws, said springs exerting a tension on the movable jaw when the trap is set.

In testimony whereof he affixes his signature.

ANDREW KERR.